(12) United States Patent
Jorgensen et al.

(10) Patent No.: US 9,432,864 B2
(45) Date of Patent: *Aug. 30, 2016

(54) GENERIC PERSISTENCE IN A DIAMETER ROUTING AGENT

(71) Applicant: Alcatel-Lucent Canada, Inc., Ottawa (CA)

(72) Inventors: Peter K. Jorgensen, Nepean (CA); Robert A. Mann, Carp (CA); Mikael Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 343 days.

This patent is subject to a terminal disclaimer.

(21) Appl. No.: 13/962,071

(22) Filed: Aug. 8, 2013

(65) Prior Publication Data

US 2013/0326001 A1 Dec. 5, 2013

Related U.S. Application Data

(63) Continuation-in-part of application No. 13/482,690, filed on May 29, 2012, and a continuation-in-part of application No. 13/482,587, filed on May 29, 2012, now Pat. No. 8,804,931, and a continuation-in-part of application No. 13/602,579, filed on Sep. 4, 2012, now Pat. No. 8,850,064.

(51) Int. Cl.
| | | |
|---|---|---|
| *G06F 15/16* | (2006.01) | |
| *H04W 24/08* | (2009.01) | |
| *H04L 29/08* | (2006.01) | |
| *H04L 12/801* | (2013.01) | |
| *H04L 12/14* | (2006.01) | |
| *H04L 29/06* | (2006.01) | |

(52) U.S. Cl.
CPC .............. *H04W 24/08* (2013.01); *H04L 47/12* (2013.01); *H04L 67/1036* (2013.01); *H04L 67/1097* (2013.01); *H04L 67/28* (2013.01); *H04L 67/327* (2013.01); *H04L 12/1407* (2013.01); *H04L 63/0892* (2013.01)

(58) Field of Classification Search
CPC .. H04W 24/08; H04L 47/12; H04L 67/1036; H04L 67/1097; H04L 67/28; H04L 67/327; H04L 12/1407; H04L 63/0892
See application file for complete search history.

(56) References Cited

U.S. PATENT DOCUMENTS

| | | | | |
|---|---|---|---|---|
| 8,825,060 | B2 * | 9/2014 | McCann et al. | 455/445 |
| 2011/0202676 | A1 * | 8/2011 | Craig | H04L 63/20 709/238 |
| 2011/0202677 | A1 * | 8/2011 | Craig | H04L 63/0892 709/238 |
| 2012/0081557 | A1 * | 4/2012 | Kupinsky et al. | 348/207.1 |
| 2012/0100849 | A1 * | 4/2012 | Marsico | 455/432.1 |
| 2012/0129488 | A1 * | 5/2012 | Patterson et al. | 455/406 |
| 2012/0158993 | A1 * | 6/2012 | McNamee | H04L 45/42 709/238 |
| 2012/0265888 | A1 * | 10/2012 | Roeland et al. | 709/228 |
| 2013/0041994 | A1 * | 2/2013 | Terrien et al. | 709/223 |

* cited by examiner

*Primary Examiner* — Ario Etienne
*Assistant Examiner* — Blake Rubin
(74) *Attorney, Agent, or Firm* — Kramer & Amado, P.C.

(57) ABSTRACT

Various exemplary embodiments relate to a method and related network node including one or more of the following: receiving a first Diameter message at the DRA; evaluating a first rule, including accessing data from a generic binding context object including: locating a record associated with a key specified by the first rule, and retrieving the data from the record; and transmitting a message based on the evaluation of the first rule. Various embodiments additionally relate to receiving a second Diameter message at the DRA; and evaluating a second rule, including accessing the generic binding context object, including storing the data in the record associated with the key.

18 Claims, 6 Drawing Sheets

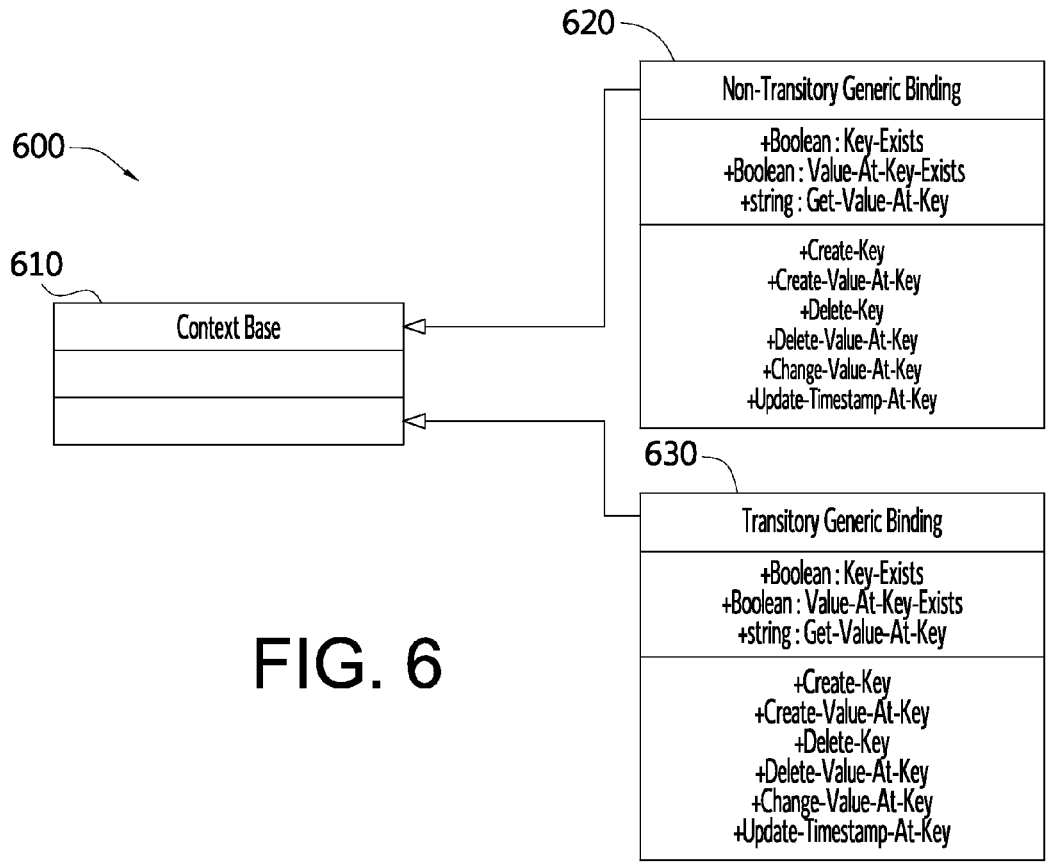

US 9,432,864 B2

GENERIC PERSISTENCE IN A DIAMETER ROUTING AGENT

CROSS-REFERENCE TO RELATED APPLICATIONS

This application is a continuation-in-part of the following co-pending applications, which are hereby incorporated by reference for all purposes as if fully set forth herein: application Ser. No. 13/482,690, filed on May 29, 2012, "ORGANIZATION OF DIAMETER ROUTING AGENT RULE SETS;" application Ser. No. 13/482,587, filed on May 29, 2012, "ROUTING DECISION CONTEXT OBJECTS;" application Ser. No. 13/602,579, filed on Sep. 4, 2012, "RULE ENGINE EVALUATION OF CONTEXT OBJECTS."

TECHNICAL FIELD

Various exemplary embodiments disclosed herein relate generally to communications networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAB) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a Diameter Routing Agent (DRA) for processing a Diameter message, the method including: receiving a first Diameter message at the DRA; evaluating a first rule, including accessing data from a generic binding context object including: locating a record associated with a key specified by the first rule, and retrieving the data from the record; and transmitting a message based on the evaluation of the first rule.

Various embodiments described herein relate to a diameter routing agent (DRA) for processing a Diameter message, the DRA including: a network interface; a volatile memory; and a processor in communication with the memory, the processor being configured to: receive a first Diameter message via the network interface; evaluate a first rule, including accessing data from a generic binding context object including: locating a record associated with a key specified by the first rule, and retrieving the data from the record; and transmit a message via the network interface based on the evaluation of the first rule.

Various embodiments described herein relate to a non-transitory machine-readable storage medium encoded with instructions for execution by a Diameter Routing Agent (DRA) for processing a Diameter message, the medium including: instructions for receiving a first Diameter message at the DRA; instructions for evaluating a first rule, including accessing data from a generic binding context object including: instructions for locating a record associated with a key specified by the first rule, and instructions for retrieving the data from the record; and instructions for transmitting a message based on the evaluation of the first rule.

Various embodiments additionally include, before evaluating the first rule: receiving a second Diameter message at the DRA; and evaluating a second rule, including accessing the generic binding context object, including storing the data in the record associated with the key.

Various embodiments additionally include, after storing the data in the record, transmitting the data to at least one other device for storage in a redundant copy of the record.

Various embodiments are described wherein storing the data in the record includes writing the data to a portion of volatile memory associated with the record.

Various embodiments are described wherein: the key includes a key label and key data, and the record is associated with both the key label and the key data.

Various embodiments are described wherein the record includes a plurality of values and retrieving the data from the record includes: locating a value of the plurality of values associated with a value label specified by the first rule, wherein the value includes the value label and value data; and retrieving the value data from the value.

Various embodiments additionally include, after transmitting the message: determining that a timestamp associated with the record indicates that the record is older than a record retention threshold; and deleting the record based on the record being older than a record retention threshold.

BRIEF DESCRIPTION OF THE DRAWINGS

In order to better understand various exemplary embodiments, reference is made to the accompanying drawings, wherein:

FIG. 6 illustrates an exemplary class diagram for generic binding objects;

FIG. 7 illustrates an exemplary data arrangement for storing binding records;

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAB) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. For example, it would be desirable to provide an intuitive interface that enables a user to define rules that persist data between multiple invocations of a rule engine.

Figure 1:
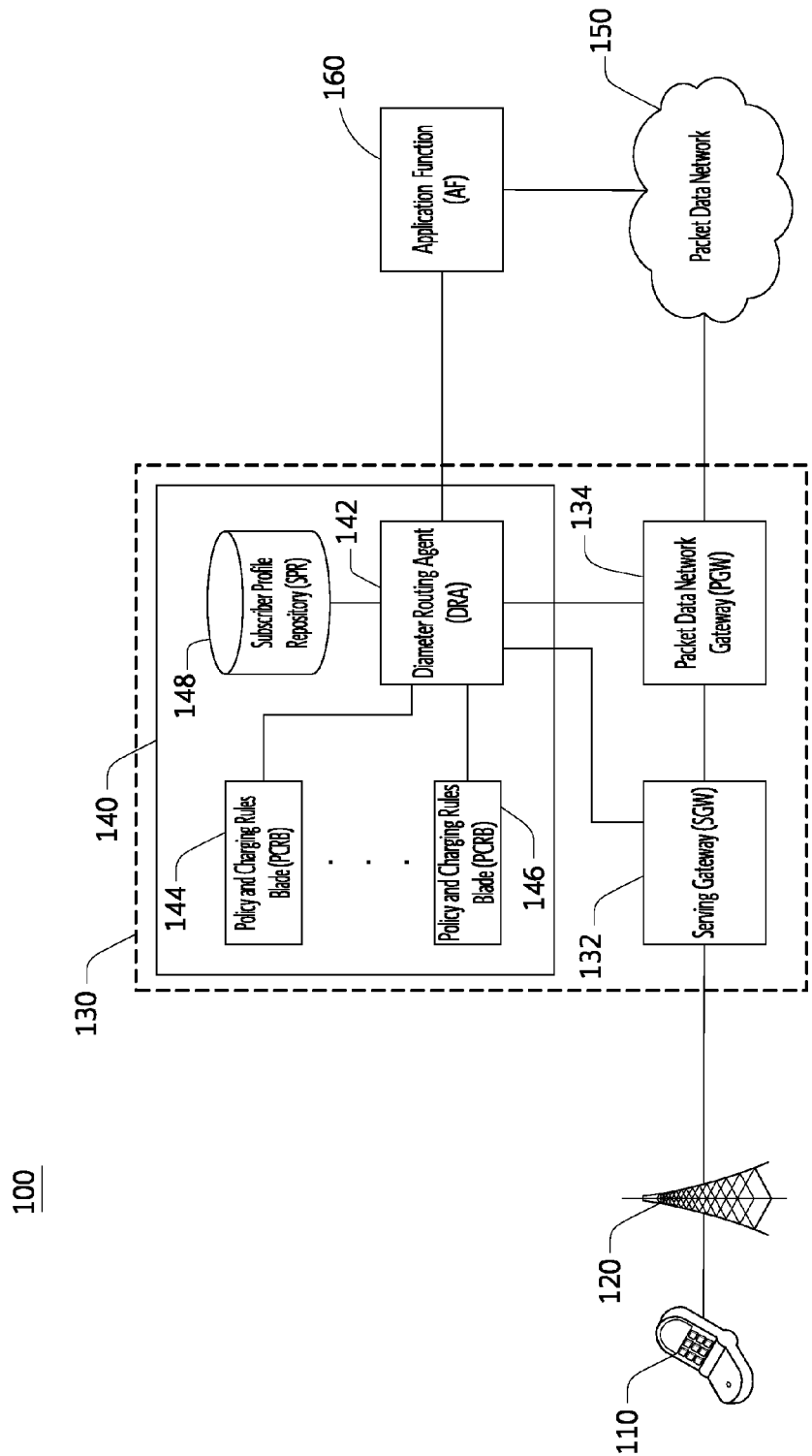
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository 148.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 148 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
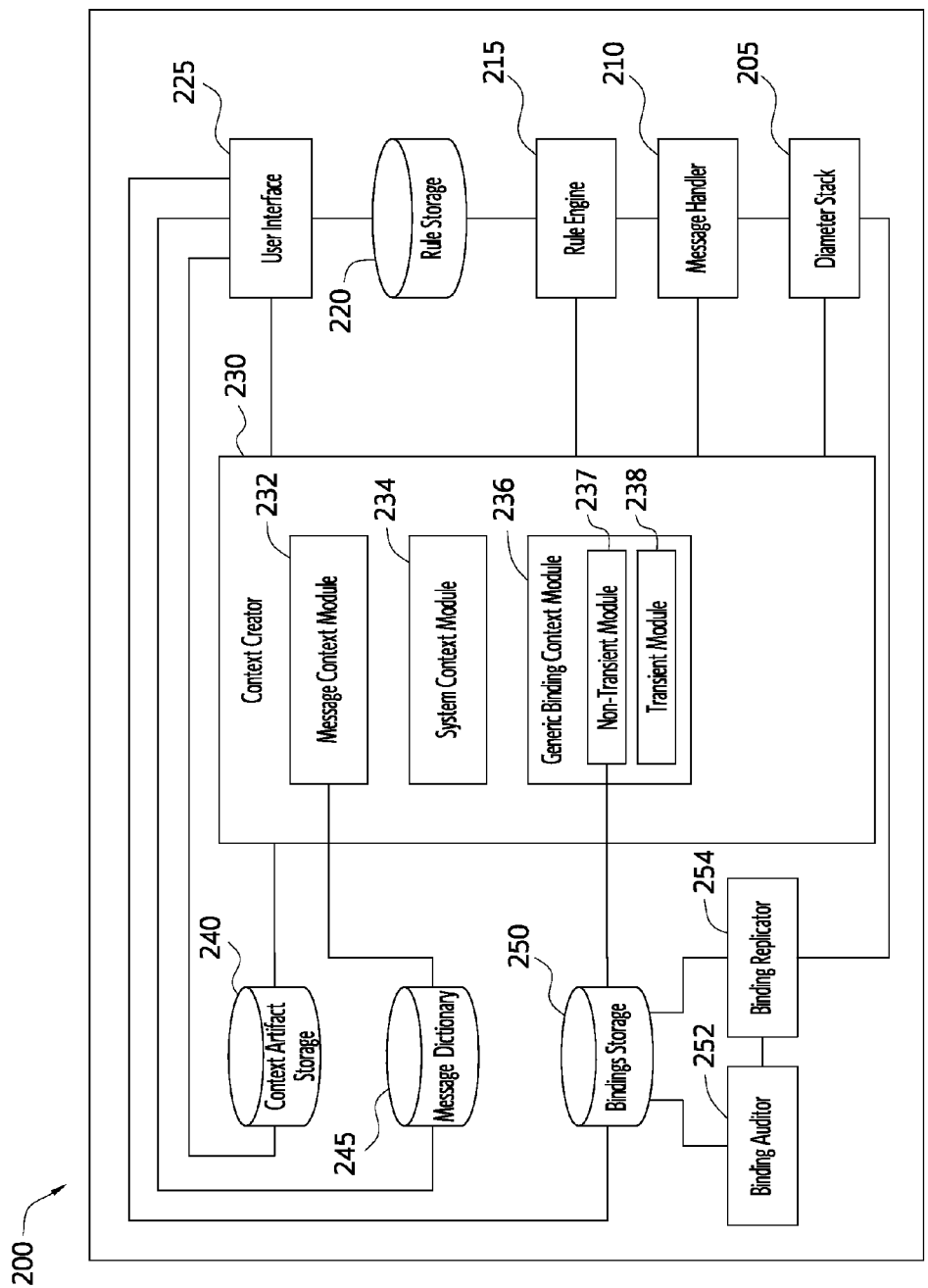
FIG. 2 illustrates a component diagram of an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, bindings storage 250, binding auditor 252, or binding replicator 254.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more results of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215. In some embodiments, one or more context objects may be instantiated before a Diameter message is received, such that the same instance of the context object is utilized by the rule engine in processing multiple subsequent Diameter messages.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a system context, or a generic binding context. These context artifacts may be used by context creator 230 at run-time to instantiate different types of context objects. As such, context creator 230 may be viewed as including a message context module 232, a system context module 234, and a generic binding context module 236. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate.

The contents of Diameter messages may vary depending on the application and command type. For example, an Rx RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, context creator 230 may be capable of defining other context objects that do not represent a Diameter message. Such context objects may be referred to as "computational contexts" and may also be defined by contexts artifacts in context artifact storage 240. Exemplary computational contexts may include objects that provide access to generic bindings, a subscription profile, a previous routing decision, a load balancer, and system level functions. Various additional computational contexts will be apparent.

As an example of a computational context, the system context module 234 may generate a system context object. The system context object may provide access to various system level functionality. For example, the system context object may provide access to routing information stored in the Diameter stack 205, enable event logging, or enable administrator messaging via dialogs or email. Various alternative or additional system functionality to expose via the system context object will be apparent.

As another example of a computational context, the generic binding context module 236 may generate one or more generic binding contexts. As will be described in greater detail below, the generic binding contexts may enable rules to store data for later use and retrieve data that has been previously stored. Such data may be bound to keys or labels to enable the storage and efficient retrieval of multiple pieces of data. The generic binding context module 236 may create "non-transient" generic binding contexts that retrieve data stored in a storage device such as the bindings storage 250 or "transient" generic binding contexts that retrieve data stored in volatile memory. As such, the generic binding context module 236 may be seen as including a non-transient submodule 237 and a transient submodule 238. The benefits of creating transient or non-transient generic binding contexts will be apparent. For example, non-transient generic binding contexts may provide more reliable persistence of data while transient generic binding contexts may provide faster access to persisted data.

The bindings storage 250 may be any machine-readable medium capable of storing bindings. Accordingly, the bindings storage 250 may include a machine-readable storage medium such as read-only memory (ROM), random-access memory (RAM), magnetic disk storage media, optical storage media, flash-memory devices, and/or similar storage media. Exemplary contents of the bindings storage 250 will be described in greater detail below with respect to FIG. 7. In various embodiments, the administrator may directly provision bindings into the bindings storage 250 via the user interface 225.

It should be noted that while rule storage 220, context artifact storage 240, message dictionary 245, and bindings storage 250 are illustrated as separate devices, one or more of these components may be resident on multiple storage devices. Further, one or more of these components may share a storage device. For example, rule storage 220, context artifact storage 240, message dictionary 245, and bindings storage 250 may all refer to portions of the same hard disk or flash memory device.

The binding auditor 252 may include hardware or executable instructions on a machine-readable storage medium configured to periodically delete records from the bindings storage 250. For example, the binding auditor 252 may be scheduled to, on a regular basis, compare a timestamp associated with each record stored in the bindings storage 250 to a current time and, if the record is older than some record retention threshold, the binding auditor 252 may delete the record. Alternatively, the periodicity of the binding auditor 252 may be defined based on the bindings storage capacity 250; for example, when the bindings storage 250 has less than a predefined amount of free space, the binding auditor 252 may begin an audit. The record retention threshold may also be defined in various ways. For example, record retention threshold may be a predefined age or may be an age determined based on the current contents of the binding storage 250 selected to lead to deletion of a desired number of records. Various other modifications will be apparent. In some embodiments, such as those wherein an operator may provision bindings directly into the bindings storage, the binding auditor 252 may be configured to exclude some records from audit. For example, the binding auditor 252 may refrain from deleting records associated with a "permanent" flag or with a timestamp set to "0." Various other manners of designating a record as a record that should not be deleted will be apparent.

The binding replicator 254 may include hardware or executable instructions on a machine-readable storage medium configured to transmit binding record updates to one or more other devices, such as redundant DRAs or PCRBs. For example, upon addition, modification, or deletion of a record in the bindings storage, the binding replicator 254 may send an update message via the Diameter stack 205 to another DRA. It will be understood that such update may not be sent according to the Diameter protocol and, instead, may be sent via a different protocol stack or base network interface. The redundant device may be local to the DRA 200 or may be located at a separate geographic location ("geo-redundant"). In some embodiments, the bindings storage 250 may be shared between multiple devices; in such embodiments an update to the bindings storage 250 may serve to update the bindings available to some redundant devices and the binding replicator 254 may avoid sending messages to such redundant devices or may be altogether absent.

Figure 3:
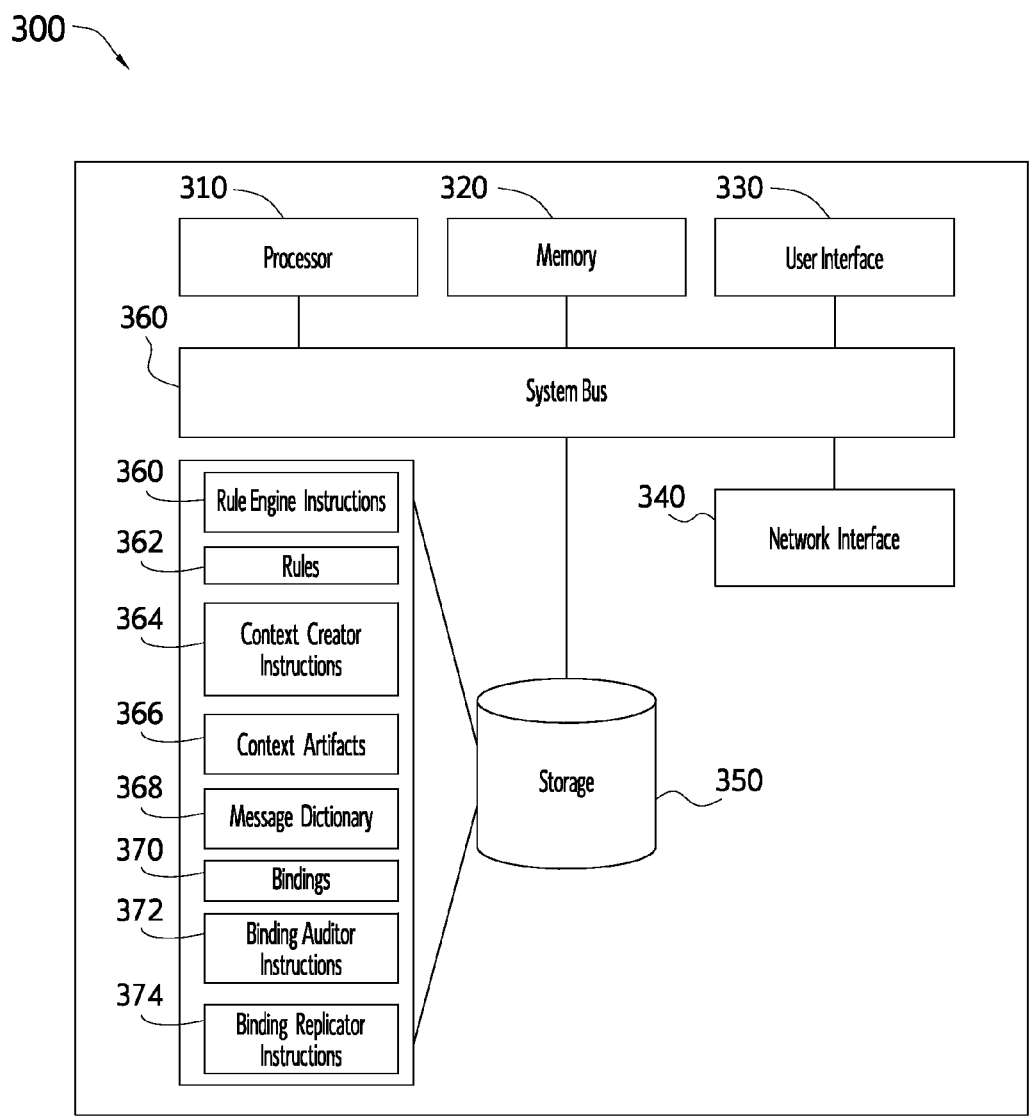
FIG. 3 illustrates a hardware diagram of an exemplary Diameter Routing Agent.

FIG. 3 illustrates an exemplary hardware diagram of a Diameter Routing Agent 300. The exemplary DRA 300 may correspond to the DRA 200 of FIG. 2 or the DRA 142 of FIG. 1. As shown, the hardware device 300 may include a processor 310, memory 320, user interface 330, network interface 340, and storage 350 interconnected via one or more system buses 360. It will be understood that FIG. 3 constitutes, in some respects, an abstraction and that the actual organization of the components of the DRA 300 may be more complex than illustrated.

The processor 310 may be any hardware device capable of executing instructions stored in memory 320 or storage 350. As such, the processor may include a microprocessor, field programmable gate array (FPGA), application-specific integrated circuit (ASIC), or other similar devices.

The memory 320 may include various memories such as, for example L1, L2, or L3 cache or system memory. As such, the memory 320 may include static random access memory (SRAM), dynamic RAM (DRAM), flash memory, read only memory (ROM), or other similar memory devices.

The user interface 330 may include one or more devices for enabling communication with a user such as an administrator. For example, the user interface 330 may include a display, a mouse, and a keyboard for receiving user commands.

The network interface 340 may include one or more devices for enabling communication with other hardware devices. For example, the network interface 340 may include a network interface card (NIC) configured to communicate according to the Ethernet protocol. Additionally, the network interface 340 may implement a TCP/IP stack for communication according to the TCP/IP protocols. Various alternative or additional hardware or configurations for the network interface 340 will be apparent.

The storage 350 may include one or more machine-readable storage media such as read-only memory (ROM), random-access memory (RAM), magnetic disk storage media, optical storage media, flash-memory devices, or similar storage media. In various embodiments, the storage 350 may store instructions for execution by the processor 310 or data upon with the processor 310 may operate. For example, the storage 350 may store rule engine instructions 360 and rules 362 read and acted upon by the rule engine. The storage 350 may also store context creator instructions 364 and the context artifacts 366, message dictionary 368, and bindings 370 used by the context creator as described above. Further, the storage 350 may store binding auditor instructions 372 and binding replicator instructions 374 for cleaning up the bindings 370 and communicating changes in the bindings 370 to other devices, respectively. It will be apparent that various information described as stored in the storage 350 may be additionally or alternatively stored in the memory 320. For example, the bindings 370 may be additionally, alternatively, or partially stored in memory 320. Various other arrangements will be apparent.

Figure 4:
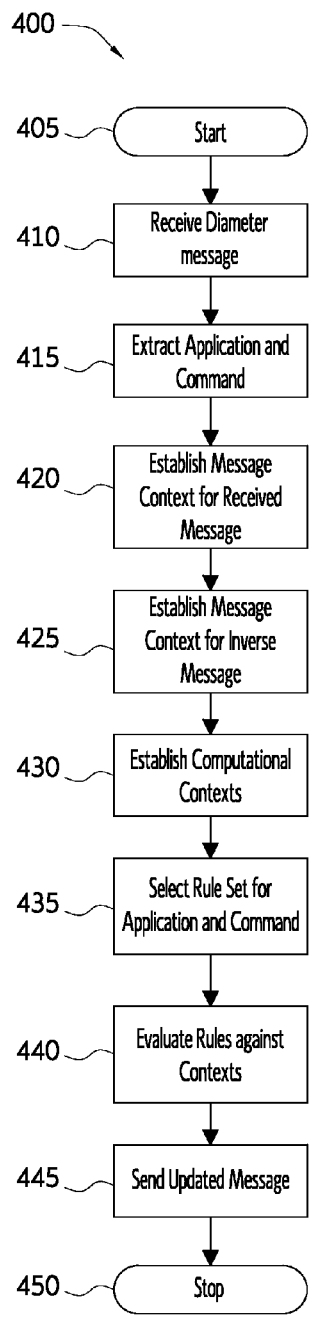
FIG. 4 illustrates an exemplary method for processing Diameter messages.

FIG. 4 illustrates an exemplary method 400 for processing Diameter messages. Method 400 may be performed by the components of DRA 200 such as, for example, Diameter stack 205, message handler 210, rule engine 215, or context creator 230.

Method 400 may begin in step 405 and proceed to step 410 where the DRA 200 may receive a Diameter message to be processed. Next, in step 415, the DRA 200 may extract a message type from the received Diameter message. In various embodiments, the message type may be defined by the application and command type of the message. Then, in step 420, the DRA may use the extracted message type to establish a message context object to wrap the received Diameter message. In a similar manner, the DRA 200 may establish a message context object for an inverse of the Diameter message in step 425. For example, the DRA 200 may use a lookup table to identify the inverse message type of the extracted message type and request a new message context based on the inverse message type.

The DRA 200 may then, in step 430, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 400 may proceed to step 435 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 440. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. Various additional uses for a reference to a context object will be apparent. After applying the appropriate rule sets, the DRA 200 may transmit one or more messages to other devices in step 445. For example, the DRA may forward the Diameter message, which may be modified, to another device or may transmit an answer back to the device that sent the received message. Method 400 may proceed to end in step 450.

As noted above, steps 435 and 440 may involve the evaluation of different types of rule sets. For example, in some embodiments, each message type may be associated with a rule set which applies to message of that type. Thus, one rule set may be applied for Gx CCR messages while a different rule set may be applied for Rx AAR messages. Some embodiments may also include rule sets that are generally applicable to all Diameter messages, all Diameter requests, or all Diameter answers. In such embodiments, the DRA 200 may evaluate multiple rule sets in sequence. Further, each of these "public" or "top-level" rule sets may themselves invoke the evaluation of one or more "private" or "lower level" rule sets.

Figure 5:
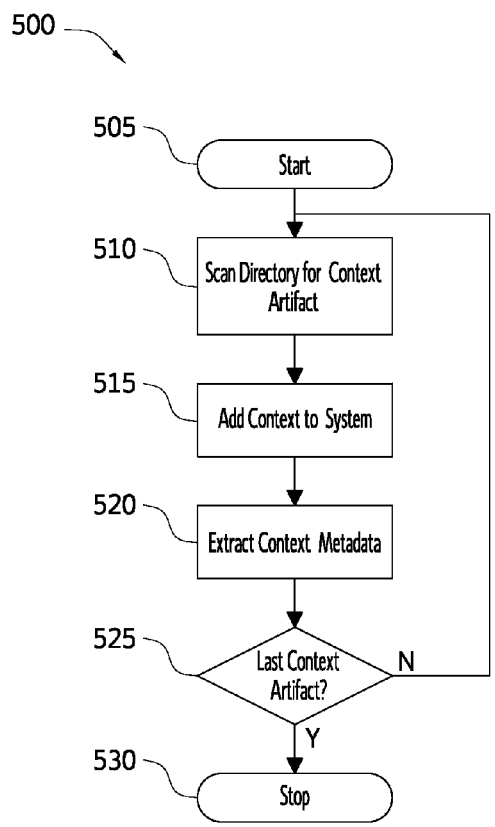
FIG. 5 illustrates an exemplary method for utilizing context artifacts.

FIG. 5 illustrates an exemplary method 400 for utilizing context artifacts. Method 500 may be performed by the components of DRA 200 such as, for example, user interface 225 or context creator 230. Method 500 may be performed, for example, upon system startup, upon request by user interface, or upon receiving a Diameter message. It will be understood that a context artifact may be used to define computational contexts as well as message contexts.

Method 500 may begin in step 505 and proceed to step 510 where the DRA may scan one or more directories for a context artifact to process. In various embodiments, the DRA may process all context artifacts located on a storage device or in a particular directory or may only process context artifacts specified in a list of artifacts to be processed. After locating a context artifact, method 500 may proceed to step 515, where the DRA may add a context object type to the system for use by a rule engine, a user interface, or a context creator. In various embodiments, such as embodiments wherein the context artifacts define one or more Java classes, step 515 may include interpreting the context artifact to enable instantiation of context objects having the context object type defined by the class. Various other methods for utilizing a context artifact to enable the use of new context object types will be apparent.

Next, in step 520, the DRA may extract any metadata for the context object type for the context object. For example a context artifact may include annotations or tags that specify a user-friendly name for the context object type, attributes, or actions. The DRA may store this metadata for use by a user interface or rule engine. Next, in step 525, the DRA may determine whether additional context artifacts remain to be processed. If additional context artifacts remain, method 500 may loop back to step 510. Otherwise, method 500 may proceed to end in step 530.

FIG. 6 illustrates an exemplary class diagram 600 for generic binding context objects 620, 630. Class diagram 600 may indicate an actual implementation of generic binding objects or may describe a context object as viewed by a user even though an actual implementation differs. As shown, the generic binding context objects 620, 630 may both extend, or otherwise be a specific instantiation of a base context object 610.

The context base class 610 may include basic context object functionality. For example, the context base class 610 may include a protected string variable for storing the received Diameter message. Additionally or alternatively, the context base class may provide one or more functions for interfacing with an API of the Diameter stack to read or manipulate the received Diameter message or other Diameter messages. Various additional or alternative attributes and actions suitable for provision in a context base class will be apparent.

The exemplary class diagram 600 may show a non-volatile generic binding context object 620 and a volatile generic binding context object 630. These context objects 620, 630 may be functionally similar or identical and may differ in where the context objects store binding records. For example, the non-volatile generic binding context object 620 may store bindings in a non-volatile storage device while the volatile generic binding context object 630 may store bindings in a volatile storage device.

The generic binding context objects 620, 630 may include multiple attributes, including functions that return a value to the rules engine. For example, the generic binding context objects 620, 630 may include two Boolean attributes: "Key-Exists" for determining whether a record has been previously established for a given key and "Value-At-Key-Exists" for determining whether data has been stored for a given value label within the record associated with a given key. generic binding context objects 620, 630 may also include an attribute for retrieving such data: "Get-Value-At-Key" may return value data associated with a given key and value label. As shown, "Get-Value-At-Key" returns a string. However, it will be understood that virtually any data type may be stored and retrieved including, for example, integers, floating point numbers, Booleans, or various collections. Such multi-type behavior may be implemented by, for example, including overloaded functions the return an appropriate data type or including separate functions for each appropriate data type. Alternately, the system may be configured such that the timestamp is updated automatically as a side-effect of all other modifications of the record.

In addition to the attributes described above, the generic binding context objects 620, 630 may also include multiple actions useful for performing tasks such as creating new bindings. As such, the generic binding context objects 620, 630 may include a "Create-Key" function that creates and stores a new record for a given key. The generic binding context objects 620, 630 may also include a "Create-Value-At-Key" action for storing a new value in a specified record for a given key. The "Delete-Key" and "Delete-Value-At-Key" actions may delete a key record or value within a key record from persistence, respectively. The "Update-Timestamp-At-Key" action may set a timestamp for a record associated with a given key to the current time or a given time. Thus, the "Update-Timestamp-At-Key" action may be used to extend the time before the record is removed by an audit.

In some embodiments, the generic binding context objects 620 may instead extend, or otherwise inherit from, a generic binding base class (not shown) which, in turn, extends, or otherwise inherits from, the context base class 610. Such a generic binding base class may define various functions common to the two different generic binding context objects 620, 630. In some such embodiments, some or all functions associated with the two different generic binding context objects 620, 630 may actually be fully defined in a generic binding base class while the generic binding context objects 620, 630 may simply include pointers to different locations (e.g., storage or memory) for locating binding records. Various other modifications will be apparent.

FIG. 7 illustrates an exemplary data arrangement 700 for storing binding records for use by a generic binding context object. As such, the data arrangement 700 may be stored in a memory 320 or storage device 350 of the DRA 300 and may reflect the contents of the bindings storage 250. It will be apparent that the data arrangement 700 may be an abstraction and may be stored in any manner known to those of skill in the art such as, for example, a table, linked list, array, database, or other structure. In some embodiments, the data arrangement 700 may be accessible using a query language such as, for example, the structured query language (SQL). The data arrangement 700 may include a key field 710 including a label subfield 712 and data subfield 714, a timestamp field 720, and a value field 730 including a label subfield 732 and a data subfield 734.

The key field 710 may store a key that identifies the record. In various embodiments, a key may include multiple parts, such as a label and data portion as stored in the label subfield 712 and data subfield 714, respectively. The timestamp field 720 may store a timestamp used during audits to determine whether a record should be removed as "stale." The value field may store one or more values for each binding record. In various embodiments, a value may include multiple parts, such as a label and data portion as stored in the label subfield 732 and data subfield 734, respectively.

The use of multi-part keys and values may increase flexibility of the generic binding context object. For example, by providing both a label and data in the value section, multiple pieces of data may be associated with a single key. Further, a label may be used to identify where an associated piece of data came from or how the data should be or is intended to be used.

As an example, binding record 740 is associated with a key having the label "SessionID" and data "abc123." This key may be used by various rules, for example, when a SessionID AVP from a received message carries the value "abc123." It will be understood, however, that the meanings attached to the key label and key data will depend on the context in which the label and data are assigned by the operator or by the rules. The record 740 may be associated with a timestamp of "1374604212" and may contain at least two values. A first value may have a label of "IPAddress" and data of "123.45.67.89." A second value may have a label of "Destination" and data of "floober.realm." These values may be used, for example, to change an IPAddress AVP value to "123.45.67.89" and a Destination-Realm AVP to a value of "floober.realm." It will again be understood that the meanings and uses for the value labels and data will depend on the context in which the label and data are used by the rules. The label and data for both keys and values may be used in any manner seen fit or useful by the operator or other entity provisioning bindings or writing rules for the DRA. The data arrangement 700 may include numerous additional records 770.

As another example, the record 750 may include a key having the same key label but a different key data from record 740. As such, rules may be able to define different sets of values for different key data, even though the key data may relate to the same key label. As shown in exemplary record 760, the key label may also differ and store virtually any value. As noted above, while the various labels and data described herein may include strings, virtually any data type may be used.

It will be understood that the value data stored in the various records may be useful by the rules engine and associated rules in many ways. For example, the value data may be used to store previous decisions, such as a destination selection for a related message; fields from a costly external SPR lookup; or computed values such as a subscriber's bandwidth usage. Various other uses will be apparent to those of skill in the art.

In various embodiments, such as those implementing geo-redundant sites, the keys and values stored in the data arrangement 700 may be further scoped, such as scoped to include a reference to a geo-redundant site that created the key or value. Such an embodiment may allow multiple geo-redundant sites that share a database or that otherwise share bindings to maintain the same key with the same key data without the necessity of managing the lifetime of both records; each site would only manage that site's copy. Each site may be able to access the other site's bindings by specifying the other site's scope in the attribute or actions call. Various modifications to the actions and attributes to implement such behavior will be apparent.

Figures 8, 9:
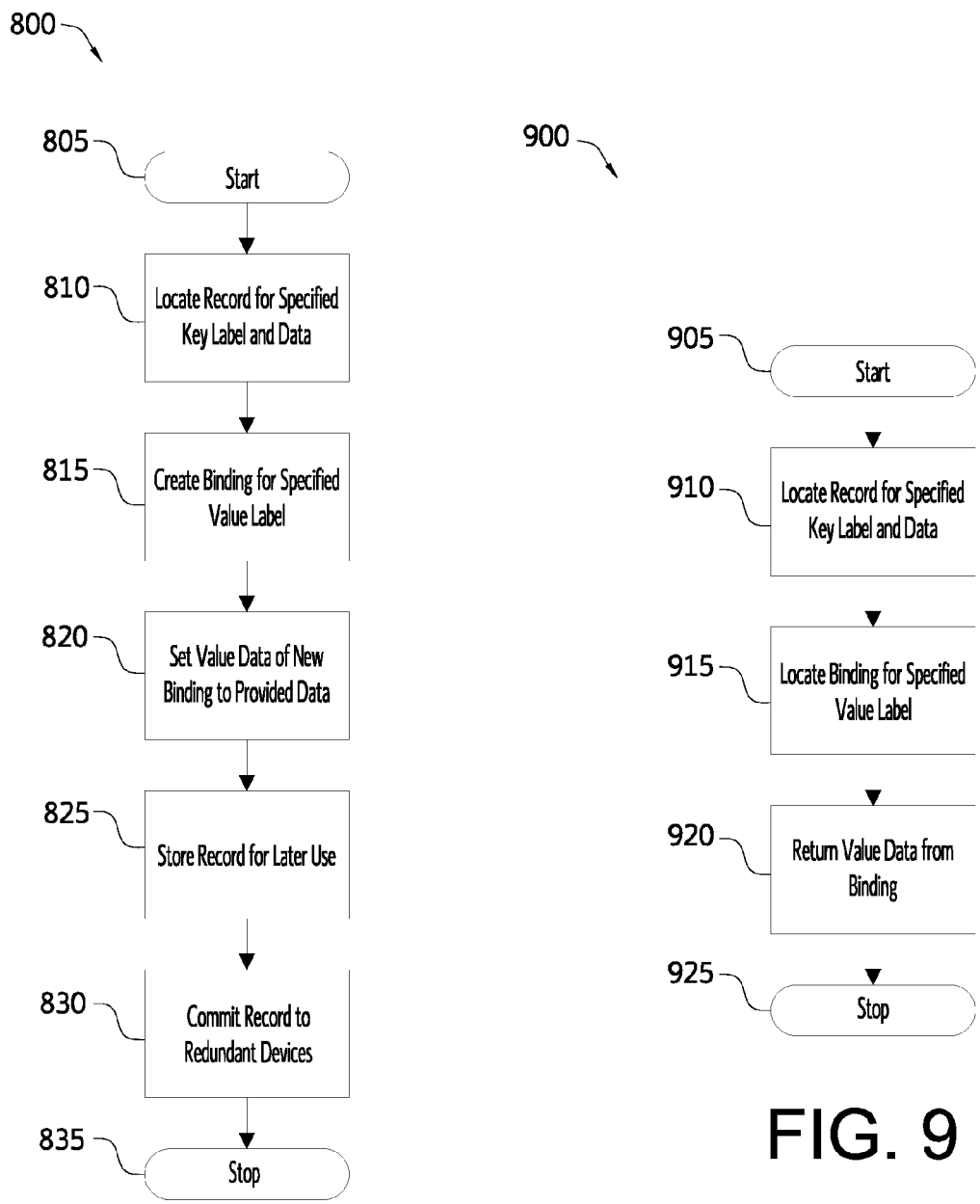
FIG. 8 illustrates an exemplary method for storing data in a generic binding.
FIG. 9 illustrates an exemplary method for retrieving data stored in a generic binding.

FIG. 8 illustrates an exemplary method 800 for storing data in a generic binding. The method 800 may be performed by the components of a DRA, such as the rule engine 215 or context creator 230 in conjunction with a rule accessing a generic binding context object. For example, the method 800 may correspond to a "Create-Value-At-Key" action of a generic binding context object.

The method may begin in step 805 and proceed to step 810 where the DRA may locate a binding record associated with a specified key label and key data. The key may be specified in the rule along with the call to the method. The DRA may locate such a record in any manner known to those of skill in the art such as, for example, by forming an SQL query based on the key label and key data. Next, in step 815, the DRA may create a new value entry within the located record for a specified value label. The value label may also be specified by the rule in conjunction with the invocation of the action. Then, in step 820, the DRA may set the data of the new value based on a data value provided by the rule. In various embodiments, steps 810, 815, and 820 may be combined; for example, in some embodiments, such as embodiments that locate records using a query language such as SQL, the DRA may generate a single SQL query including the key label, key data, and value label to insert a new record or modify and existing record to include the specified value data. At this point, if the generic binding context object is a volatile generic binding context object, the method may proceed directly to end 835 as the update may already be stored in volatile memory.

If, on the other hand, the generic binding context object is a non-volatile generic binding context object, the method may proceed to step 825 where the generic binding context object may store the updated record in non-volatile memory for future accesses. The non-volatile memory may be a database local to the DRA or shared between multiple DRAs or other devices. In step 830, the DRA may commit the updated record to any appropriate redundant devices. For example, the DRA is configured with operate in a redundant pair with a geographically remote DRA or another DRA that does not share access to the non-volatile memory, the DRA may transmit a message to the other device identifying the update to the record. The method may then proceed to end in step 835.

FIG. 9 illustrates an exemplary method for retrieving data stored in a generic binding. The method 900 may be performed by the components of a DRA, such as the rule engine 215 or context creator 230 in conjunction with a rule accessing a generic binding context object. For example, the method 900 may correspond to a "Get-Value-At-Key" action of a generic binding context object.

The method may begin in step 905 and proceed to step 910 where the DRA may locate a binding record associated with a specified key label and key data. The key may be specified in the rule along with the call to the method. Next, in step 915, the DRA may locate a value entry within the located record based on a specified value label. The value label may also be specified by the rule in conjunction with the invocation of the action. In various embodiments, steps 910 and 915 may be combined; for example, in some embodiments, such as embodiments that locate records using a query language such as SQL, the DRA may generate a single SQL query including the key label, key data, and value label to locate the desired value data within the database or other data structure. Then, in step 920, the DRA may return the data of the located value for used by the rule. The rule may then proceed to utilize the value data in any manner specified by the rule such as, for example, copying the value data into a Diameter message. The method 900 may proceed to end in step 925.

Implementations for the other actions and attributes associated with the generic binding context object will be apparent in view of the foregoing. For example, various other actions and attributes may be implemented in some embodiments as functions that construct appropriate SQL queries that, when executed in connection with the data structure that stores bindings, effect the described functionality.

Using the various attributes and actions described herein, an operator may be able to define rule sets that share information across multiple rule engine invocations or may be able to defer to another object to provide values for use in processing diameter messages. For example, in the following exemplary rule set, the rule engine will first check whether the binding for the received Gx CCR's Session-ID AVP (as associated with the SessionID key label) includes a previously set value for the value label "IPAddress." If so, the rule engine will copy the previously set value data to the IP-Address AVP of the Gx CCR. Otherwise, the rule engine will set the IP-Address AVP of the Gx CCR to the literal value of "123.45.67.89" and subsequently save this to the "IPAddress" value in the associated binding record for later use.

---

Rule Table: Generic Binding Example
Rule Sets:
    Gx CCR
IF
    Generic Binding.Value-At-Key-Exists(Key Label = SessionID,
        Key's Value = Gx CCR.Session-ID,
        Value Label = IPAddress)
THEN
    Gx CCR.IP-Address = Generic Binding.Get-Value-At-Key
        (Key Label = SessionID, Key's Value = Gx
        CCR.Session-ID, Value Label = IPAddress)
ELSE
    Gx CCR.IP-Address = 123.45.67.89
    Generic Binding.Create-Value-At-Key (Key Label = SessionID,
        Key's Value = Gx CCR.Session-ID, Value Label =
        IPAddress, Value Data = 123.45.67.89)

---

According to the foregoing, various embodiments enable robust and dynamic handling of various Diameter messages at a diameter routing agent. In particular, by providing a generic binding context, rules may persist information between multiple invocations of the rule engine. Various additional benefits will be apparent in view of the foregoing.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
    receiving a first Diameter message at the DRA;
    evaluating a first rule, comprising accessing data from a generic binding context object, wherein a context object is an instantiated data structure used to store and access data related to whatever is modifying it, comprising:
        locating a record associated with a key specified by the first rule, and
        retrieving the data from the record; and
    transmitting a message based on the evaluation of the first rule; and
    after transmitting the message:
        determining that a timestamp associated with the record indicates that the record is older than a record retention threshold; and
        deleting the record based on the record being older than a record retention threshold.

2. The method of claim 1, further comprising, before evaluating the first rule:
receiving a second Diameter message at the DRA; and
evaluating a second rule, comprising accessing the generic binding context object, comprising storing the data in the record associated with the key.

3. The method of claim 2, further comprising, after storing the data in the record, transmitting the data to at least one other device for storage in a redundant copy of the record.

4. The method of claim 2, wherein storing the data in the record comprises writing the data to a portion of volatile memory associated with the record.

5. The method of claim 1, wherein:
the key comprises a key label and key data, and
the record is associated with both the key label and the key data.

6. The method of claim 1, wherein the record comprises a plurality of values and retrieving the data from the record comprises:
locating a value of the plurality of values associated with a value label specified by the first rule, wherein the value includes the value label and value data; and
retrieving the value data from the value.

7. A diameter routing agent (DRA) for processing a Diameter message, the DRA comprising:
a network interface;
a volatile memory; and
a processor in communication with the memory, the processor being configured to:
receive a first Diameter message via the network interface; evaluate a first rule, comprising accessing data from a generic binding context object, wherein a context object is an instantiated data structure used to store and access data related to whatever is modifying it, comprising:
locating a record associated with a key specified by the first rule, and
retrieving the data from the record; and
transmit a message via the network interface based on the evaluation of the first rule; and
after transmitting the message:
determine that a timestamp associated with the record indicates that the record is older than a record retention threshold; and
delete the record based on the record being older than a record retention threshold.

8. The DRA of claim 7, wherein the processor is further configured to, before evaluating the first rule:
receive a second Diameter message at the DRA; and
evaluate a second rule, comprising accessing the generic binding context object, comprising storing the data in the record associated with the key.

9. The DRA of claim 8, wherein the processor is further configured to, after storing the data in the record, transmitting the data to at least one other device for storage in a redundant copy of the record.

10. The DRA of claim 8, wherein, in storing the data in the record, the processor is configured to write the data to a portion of the volatile memory associated with the record.

11. The DRA of claim 7, wherein:
the key comprises a key label and key data, and
the record is associated with both the key label and the key data.

12. The DRA of claim 7, wherein the record comprises a plurality of values and, in retrieving the data from the record, the processor is configured to:
locate a value of the plurality of values associated with a value label specified by the first rule, wherein the value includes the value label and value data;
retrieve the value data from the value.

13. A non-transitory machine-readable storage medium encoded with instructions for execution by a Diameter Routing Agent (DRA) for processing a Diameter message, the medium comprising:
instructions for receiving a first Diameter message at the DRA;
instructions for evaluating a first rule, comprising accessing data from a generic binding context object, wherein a context object is an instantiated data structure used to store and access data related to whatever is modifying it, comprising:
instructions for locating a record associated with a key specified by the first rule, and
instructions for retrieving the data from the record; and
instructions for transmitting a message based on the evaluation of the first rule and
after transmitting the message:
instructions for determining that a timestamp associated with the record indicates that the record is older than a record retention threshold; and
instructions for deleting the record based on the record being older than a record retention threshold.

14. The non-transitory machine-readable storage medium of claim 13, further comprising:
instructions for receiving a second Diameter message at the DRA; and
instructions for evaluating a second rule, comprising accessing the generic binding context object, comprising storing the data in the record associated with the key.

15. The non-transitory machine-readable storage medium of claim 14, further comprising instructions for transmitting the data to at least one other device for storage in a redundant copy of the record.

16. The non-transitory machine-readable storage medium of claim 14, wherein the instructions for storing the data in the record comprise instructions for writing the data to a portion of volatile memory associated with the record.

17. The non-transitory machine-readable storage medium of claim 13, wherein:
the key comprises a key label and key data, and
the record is associated with both the key label and the key data.

18. The non-transitory machine-readable storage medium of claim 13, wherein the record comprises a plurality of values and the instructions for retrieving the data from the record comprise:
instructions for locating a value of the plurality of values associated with a value label specified by the first rule, wherein the value includes the value label and value data;
instructions for retrieving the value data from the value.

* * * * *